June 30, 1970 C. R. MESSER 3,517,706

CHECK STRAP ASSEMBLY

Filed Sept. 17, 1968

INVENTOR.
Chester R. Messer
BY Kenway, Jenney & Hildreth
Attys

United States Patent Office 3,517,706
Patented June 30, 1970

3,517,706
CHECK STRAP ASSEMBLY
Chester R. Messer, Concord, N.H., assignor to Page Belting Company, Concord, N.H., a corporation of New Hampshire
Filed Sept. 17, 1968, Ser. No. 760,229
Int. Cl. D03d 49/40
U.S. Cl. 139—161                                   3 Claims

ABSTRACT OF THE DISCLOSURE

A check strap assembly comprising a closed inner loop of predetermined length, a closed center loop of greater length slidably containing the said inner loop and being itself bodily movable in respect to picker stick action, and an open outer auxiliary loop fixed at both ends in position to arrest endwise movement of the contiguous inner and center loops, together with friction fingers engaging the inner and center loops and the said loops being stiffened to prevent creeping in the operation of the loom.

---

This invention comprises a new and improved check strap assembly for absorbing the momentum and impact of the picker stick and shuttle operating in a high speed loom.

The problem of smoothly and accurately checking the oscillation and momentum of the picker stick in a loom has engaged the textile industry for many decades. One of the most successful check assemblies now in use includes a pair of closed endless loops, one slidably contained in the other, and an open auxiliary loop fastened at one end and guided to render or reeve about the end of the outer of the two endless loops, that is to say, its free end moves twice as far as its bight.

In continued use the strap of the auxiliary loop is likely to stretch and must be watched for repeated adjustment. It also has a tendency progressively to turn the endless loops by causing them to creep out of their original setting and thus frequently bring the spliced joints of the loop into destruction range of the associated friction fingers.

I have discovered that these objections may be obviated and certain advantages achieved by employing a closed auxiliary loop, fixed at both ends and so eliminating any rendering action of the auxiliary loop in the contiguous endless loop. By stiffening their straight side portions by impregnation of urethane or the like creeping of the endless loops is also prevented. I have thus eliminated a cause of trouble in the past and presented means for preventing its occurrence.

The novel check assembly above described has been found to possess unexpected improvement in length of service and in the smooth and graduated dissipation of the momentum of the picker stick. The loom is made quieter in operation and the necessity of adjustment reduced to a minimum.

These and other features of the invention will be best understood and appreciated from the following description of a preferred embodiment thereof, selected for purposes of illustration and shown in the accompanying drawings, in which—

Figure 1:
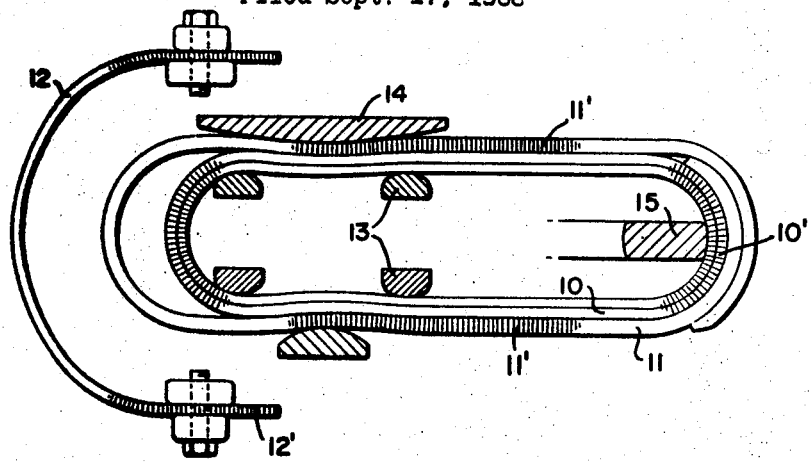
Figure 2:
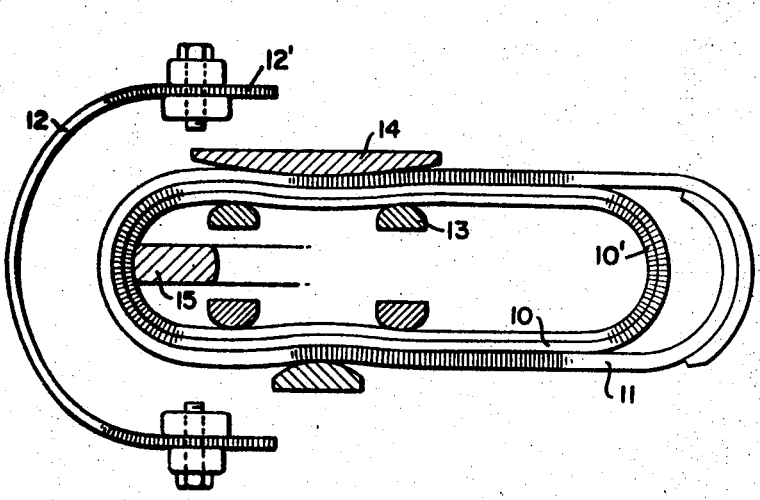
Figure 3:
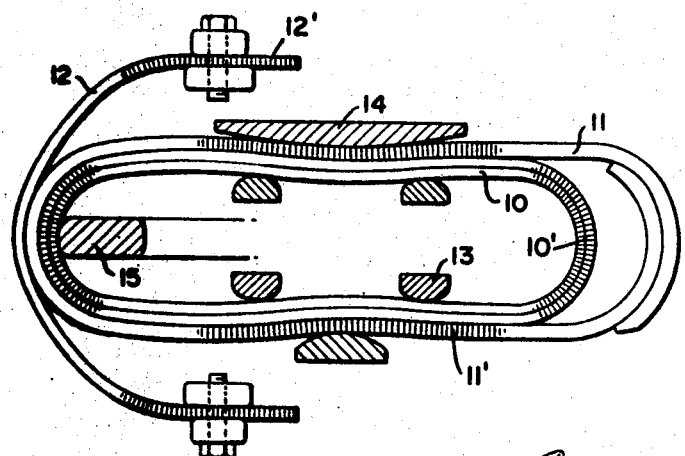

FIGS. 1, 2 and 3 are plan views of the assembly showing its parts in three progressive positions.

The assembly herein shown comprises an endless closed inner loop 10 which may be constructed of close woven nylon or other synthetic resinous compound. The loop is elongated, having approximately parallel straight sides, and molded semi-circular ends.

The center loop 11 is also elongated, having parallel straight sides and molded semi-circular ends. It is substantially longer than the inner loop 10 which it slidingly encloses. It has a lap joint at one end whereas the inner loop has a butt joint, not shown, in one of its straight sides.

The outer auxiliary loop 12 is fixed at both ends by bolts set in supporting arms presented by the loom frame. Its bowed body extends in catenary formation at a predetermined distance from the leading end of the center loop 11 and in symmetrical relation thereto.

Internal and external friction fingers 13 and 14 engage the straight overlapping sides of the inner and center loops and impart a sinuous retarding path to them as they travel back and forth within range.

In FIG. 1 the picker stick 15 is shown in final third stage position engaged with the right-hand end of the inner loop 10. In this position the left-hand end of the center loop 11 is spaced inwardly from the bow of the auxiliary loop and the leading end of the inner loop 10 is spaced inwardly by about the same distance from the leading end of the center loop 11.

As the picker stick 15 moves from its position in FIG. 1 to its position in FIG. 2 it makes direct contact with the inner loop 10 and advances it into first stage contact with the leading end of the center loop 11. Continued movement of the picker stick is then transmitted to the contiguous loops and they are advanced together in second stage into the third stage contact with the auxiliary loop 12 as shown in FIG. 3. It will thus be seen that the movement of the picker stick is checked in three stages, first by movement of the inner loop 10, then by movement of the contiguous loops and finally by deforming and stretching action of the auxiliary loop 12. In this latter stage there is little or no reeving of the auxiliary loop about the advancing end of the center loop 11 and stretching of the auxiliary loop is substantially equal on both sides of its point of contact with the center loop.

It will be apparent that in this final stage no tendency to creep is imparted by the auxiliary loop 12 to the other loops of the assembly. A troublesome tendency found in prior assemblies is thus eliminated.

This tendency of the inner loops to creep is further obviated by stiffening and smoothing the loops by impregnation of polyurethane or the like in the shaded areas of the drawing, that is to say, in the straight side portions of the center loop 11 and the bowed end portions of the inner loop 10. The impregnated portions are indicated by primed reference characters, i.e., 10' in the inner loop, 11' in the center loop, etc.

Having thus disclosed my invention what I claim as new and desire to secure by Letters Patent is:

1. A three-stage check assembly for looms, operating in successive stages to arrest picker stick action and comprising (1) an inner endless loop of predetermined length and preformed ends, mounted for bodily sliding in response to the picker stick impact, (2) a center endless loop of greater predetermined length, being also mounted for independent bodily sliding, having also preformed ends and slidably containing the said inner loop, and (3) an outer auxiliary open loop fixed at both ends and spaced beyond the end of the center endless loop in position to arrest the successive movements of the contiguous inner and center loops under actuation of a picker stick, together with friction fingers engaging the center and inner loops and wherein the side portions of the center loop are stiffened by urethane impregnation thereby preventing progressive creeping of the loop in operation of the loom.

2. A check assembly as described in claim 1, further characterized in that the inner and center loops have straight sides arranged in sliding contact and being stiffened by impregnation within their range of travel between cooperating friction fingers.

3. A check assembly as described in claim 1, further characterized in that the inner and center loops have semi-circular ends which are stiffened in concentric arcs at both ends of the loops.

References Cited

UNITED STATES PATENTS

| 2,796,087 | 6/1957 | Moon et al. | 139—165 |
| 2,915,092 | 12/1959 | Budzyna | 139—165 |
| 3,189,055 | 6/1965 | Zobrist | 139—164 |
| 3,288,174 | 11/1966 | Messer | 139—161 |
| 3,358,716 | 12/1967 | Messer | 139—161 |

JAMES KEE CHI, Primary Examiner